Patented Apr. 19, 1949

2,467,853

UNITED STATES PATENT OFFICE 2,467,853

METHOD OF PREPARING METHYL-SUBSTITUTED POLYSILOXANES

Ralph L. Poskitt and George S. Irby, Jr., Pittsfield, Mass., assignors to General Electric Company, a corporation of New York No Drawing. Application January 17, 1948, Serial No. 2,971

9 Claims. (Cl. 260—37)

This invention relates to a process for preparing methyl-substittued polysiloxanes and products obtained thereby. More particularly, the invention relates to the preparation of a composition of matter especially adapted for coating, filling, and adhesive applications, which process comprises (1) heating a mixture comprising (a) a liquid polymeric dimethylsiloxane containing up to 2 mol per cent copolymerized monomethylsiloxane and (b) a condensation catalyst for (a) until the thickening mass has just passed from the "stringy" stage to a stage wherein a sample drop removed from the said mass, when immediately touched with a rod, fails to give a string when the rod is withdrawn, but instead snaps back, and (2) adding to the molten mass obtained in (1) a finely divided, water-insoluble, wholly inorganic pigment selected from the class consisting of metallic oxides and metallic salts.

In Agens application, Serial No. 526,473, filed March 14, 1944, now U. S. Patent 2,448,756, issued September 7, 1948, and assigned to the same assignee as the present invention, there is disclosed and claimed solid elastic compositions of matter having outstanding resistance to heat and cold. More particularly, the said application relates to solid elastic compositions comprising the product of condensation of liquid polymeric dimethylsiloxane containing up to 2 mol per cent copolymerized monomethylsiloxane. In accordance with the procedure outlined in the aforementioned Agens application, the liquid polymeric methylsiloxane is heated in the presence of a condensing agent, e. g., ferric chloride, until an elastic mass is obtained. This elastic mass may be compounded on rubber rolls with various fillers and thereafter vulcanized under heat and pressure with, for instance, benzoyl peroxide (as disclosed and claimed in Wright et al. application Serial No. 526,472, now U. S. Patent 2,448,565, issued September 7, 1948, filed concurrently with the aforementioned Agens application) to yield cured, flexible elastomers.

Attempts have been made to employ the uncured gums or solid elastic products prepared in accordance with the teachings of the Agens application for adhesives or coating compositions. However, these materials have been unsatisfactory for these purposes, because of the poor adhesion and cohesion properties obtained. Thus when employed in adhesive applications, the bond has been too weak to be practical. When the uncured gums have been employed as coating compositions, it was found that there existed little adhesion of the rubbery surface to the backing coated with the said gum.

We have now discovered that the foregoing difficulties can be avoided and compositions of matter having eminent suitability as adhesives and coating compositions can be prepared if in the preparation of the adhesive or coating composition, the condensation of the liquid polymeric methylsiloxane is carried out with a suitable condensation catalyst to a determined critical stage of condensation, and a finely divided, water-insoluble, wholly inorganic pigment selected from the class consisting of metallic oxides and metallic salts is immediately incorporated in the cocondensed product while it is in a molten, i. e., still viscous liquid, condition.

The starting liquid polymeric methylsiloxanes employed in the practice of the present invention may be prepared, for example, by the hydrolysis of a pure or substantially pure dimethyldihalogenosilane, for instance, dimethyldichlorosilane, or a dimethyl-substituted silane (the methyl groups being joined to the silicon atoms through carbon atoms), whose other two valences are satisfied by radicals which themselves are readily hydrolyzable, for example, hydrogen, amino, alkoxy, aroxy, acyloxy, etc., radicals.

Various methods may be employed to prepare the aforementioned liquid polymeric methylsiloxanes used in the practice of this invention. For instance, substantially pure dimethyldichlorosilane, or dimethyldichlorosilane containing from 0.01 to 2 mol per cent, preferably from 0.1 to 1 mol per cent methyltrihalogenosilane, more specifically, methyltrichlorosilane, is hydrolyzed in manners now well-known in the art. The oily hydrolysis product may then be fractionally distilled to removed the low boiling materials (trimers, tetramers, etc), although this is not necessary, thereby obtaining the higher molecular weight liquid methyl polysiloxanes. It will, of course, be apparent to those skilled in the art that instead of employing a methyltrihalogenosilane, monomethyl-substituted silanes containing three hydrolyzable groups described in connection with the description of the dimethyl-substituted silanes in the previous paragraph may also be employed in place thereof. Those hydrolysis products found useful in the practice of our invention, which have been and will hereinafter be generically referred to as "liquid methyl polysiloxanes," are those having a methyl-to-silicon ratio of from 1.98, preferably 1.995 to 2 methyl groups per silicon atom. Optimum properties of the silicone composition are obtained from hydrolysis products of a mixture comprising substantially dimethyldichlorosilane and containing up to 0.5 mol per cent methyltrichlorosilane.

Stated alternatively, the starting liquid polymeric methyl polysiloxanes employed in the preparation of our claimed compositions of matter may be considered as being composed of polymeric dimethylsiloxanes containing up to 2 mol per cent copolymerized monomethylsiloxane wherein the methyl-to-silicon ratio is from 1.98 to 2 methyl groups per silicon atom.

The liquid methyl polysiloxanes employed in the practice of our invention may be prepared by hydrolyzing methylsilanes containing silicon-bonded hydrolyzable groups. For example, we may hydrolyze a dimethyldihalogenosilane, for instance, dimethyldichlorosilane, either alone or with up to 2 mol per cent of a methyltrihalogenosilane, for instance, methyltrichlorosilane. Various condensation catalysts may be employed in the preparation of the higher molecular weight polymeric methyl polysiloxane from the starting liquid polysiloxane. Among these may be mentioned, for instance, iron halides, for example, ferric chloride, both the hydrous (e. g., ferric chloride hexahydrate) and anhydrous forms, etc.; aluminum chloride, phenylphosphoryl chloride, sulfuryl chloride, sodium hydroxide, potassium hydroxide, etc. Many other suitable condensing agents may be found disclosed, for example, in Sprung application, Serial No. 676,091, filed June 11, 1946, and assigned to the same assignee as the present invention.

We have found that many water-insoluble, inorganic pigments selected from the class consisting of metallic oxides and salts can be added to the condensed liquid methyl polysiloxane to obtain the desired results. Examples of such inorganic metallic oxides and metallic salts are, for instance, lithopone, titanium dioxide, zirconium oxide, lead carbonate, calcium sulphate, ferric oxide, zinc chromate, calcium carbonate, zinc oxide, chromic oxide, aluminum oxides, etc. Good results are obtained when the aforementioned metallic salts and oxides are added in an amount equal to, by weight, from 0.25 to 3 parts, preferably from 0.5 to 2 parts, by weight, of the metallic oxide or metallic salt, per part of the condensed methyl polysiloxane. However, it will be apparent to those skilled in the art that smaller or larger amounts than those disclosed above may be employed without departing from the scope of our claimed invention. Titanium dioxide is advantageously employed as the finely divided material in our claimed process for obtaining compositions with optimum properties.

Various methods may be employed in practicing our claimed process. Preferably, the liquid methyl polysiloxane is placed in a vessel provided with a suitable stirring arrangement and a means for heating said vessel. The condensing agent is added to the liquid mass and the temperature of the mixture raised to from about 80° to 130° C. while being stirred vigorously. Usually, at these temperatures, the liquid methyl polysiloxane begins to condense quite readily, and at most, from ½ to 6 hours are required to reach the desired stage of condensation, depending upon the temperature and condensation catalyst. Higher and lower temperatures as well as longer or shorter periods of time may be employed without departing from the scope of our invention.

As the liquid methyl polysiloxane approaches the critical stage of condensation at which the water-insoluable, inorganic pigment is to be added, it is necessary that samples of the reacting mass be tested in order to determine the proper degree of condensation. The method found most suitable and reproducible comprises the following: As the condensation proceeds, a small drop is removed from the reacting mass, placed on a suitable surface and immediately touched with a rod, e. g., a glass rod. At this stage, the liquid is very "short" and cannot be stretched off the surface.

As the condensation continues, the liquid drop lengthens so that it can be stretched as much as 12 to 18 inches off the surface when the rod is allowed to touch the sample drop and the rod withdrawn. This usually requires from 30 to 45 minutes at about 120° C., when, e. g., anhydrous ferric chloride is employed as the condensation catalyst. Further testing of sample drops in the above-described manner will reveal that the liquid methyl polysiloxane has entered a soft gum stage (when cool) and a hot, sample globule removed from the reaction mass and tested with the rod as disclosed above can be stretched scarcely at all, but instead snaps back. It is at the very point that the thickening mass has passed from the above-described "stringy" stage to a stage where a rod touched to a sample drop fails to give this string when the rod is withdrawn, that the water-insoluble, inorganic pigment is added directly to the mass while the latter is in a molten condition.

Although the procedure described above requires periodic testing of the condensing material, nevertheless, surprisingly good reproducible results have been obtained by the aforementioned control methods. It has been found advantageous to sample the reacting mass for the approach and passing of the stringy stage at intervals of about 1 to 2 minutes after perceptible thickening of the mass.

It is not necessary that the water-insoluble, inorganic pigment be added at any split second. We have found that as the liquid methyl polysiloxane thickens and the first sign that the "stringy" stage has been passed, as much as 1 to 3 minutes after such stage has been noted may be allowed to elapse before the addition of the pigment without impairing the properties of the final product. It is, however, essential that the pigment be added while the condensed material is still at an elevated temperature in a molten mass, since increased handling difficulties are encountered if the mass is allowed to cool down.

Small amounts of lubricants, for example, from 0.05 to 0.5 per cent, by weight, stearic acid, based on the weight of the reaction mass, may be added thereto at the same time as the water-insoluble, inorganic pigment. Thereafter the mixture of the condensed liquid methyl polysiloxane and the filler are heated, for example, at a temperature of about 110° to 130° C., for at times ranging, for instance, from 2 to 6 hours to break down the mass into a smooth, homogeneous paste. The mixture may then be cooled and stored for indefinite periods without any detrimental change in the physical characteristics of the paste.

The paste obtained in accordance with the foregoing directions may be employed as a coating composition for various backing materials such as cloth, for example, glass cloth, etc.; metal surfaces, etc. If desired, the paste may be thinned with a suitable volatile liquid, for example, toluene, to give a more workable consistency.

Suitable curing or vulcanization agents, e. g., benzoyl peroxides, tertiary butyl perbenzoate, etc., may be added to the paste prior to its use for the particular application. The addition of the curing agent may be made after cooling the reaction mass following the condensation and addition of the pigment, without materially affecting the shelf life of the paste. The addition of the curing agent may, however, be deferred until immediately before using the paste.

For coating applications we have found that the usual amounts of benzoyl peroxide, for example, from 3 to 6 per cent, by weight, based on the weight of the starting weight of the liquid polymeric methylsiloxane, may be advantageously employed. Unexpectedly, it was found that per cents as high as 6 per cent, by weight, benzoyl peroxide were not suitable for uses involving adhesive applications. We have discovered that if benzoyl peroxide in an amount ranging from 9 to 15 per cent, by weight, based on the weight of the starting weight of the liquid methyl polysiloxane, is added to the paste, improved adhesive characteristics are obtained. Smaller amounts of benzoyl peroxide lead to inferior adhesion and cohesion results. The effect of using high proportions of benzoyl peroxide was entirely unexpected and unobvious from the results of prior work which had indicated that amounts in excess of about 6 per cent had a deleterious effect on the condensed methylpolysiloxanes prepared in accordance with previous known methods as, for example, disclosed in the aforementioned Agens application.

In order that those skilled in the art may better understand how the present invention may be practiced, the following examples are given by way of illustration rather than by way of limitation. All parts are by weight.

Example 1

About 100 parts liquid polymeric dimethylsiloxane containing 0.4 mol per cent copolymerized monomethylsiloxane (obtained by cohydrolyzing a mixture consisting of dimethyldichlorosilane and methyltrichlorosilane in a molar proportion of 99.6 per cent of the former and 0.4 per cent of the latter) and 0.2 part FeCl$_3$ (anhydrous) were placed in a steam-jacketed stainless steel vessel furnished with a stirrer and suitable arrangements for heating the said vessel. The liquid methyl polysiloxane was heated at about 120° C. until thickening of the liquid become noticeable. This occurred after about 30 minutes of heating. A sample of the liquid removed from the vessel and touched with a rod could be stretched for from 6 to 12 inches. Within the next 10 to 15 minutes, touching of samples with the rod revealed that strings almost 18 inches in length could be obtained by this method. After about slightly over 45 minutes at the aforementioned temperature, when a test showed that a string could no longer be obtained by touching the sample with the glass rod, but instead the sample snapped back, 100 parts TiO$_2$ and 0.4 part stearic acid were added to the reacting mass and the total mixture heated with continued stirring at about 120° C. for about 3 to 4 hours until a smooth, homogeneous paste was obtained. The mass was cooled and 0.5 part lead oxide (stabilizing agent) and 3.0 parts benzoyl peroxide were added and the mass again thoroughly mixed to disperse the curing agent.

Example 2

The above paste prepared in Example 1 containing the benzoyl peroxide was knife-coated on both sides of a glass cloth having a thickness of 7 mils. The coated cloth was heated at 200° C. for 1 hour. Tests conducted on this coated cloth, which had a total thickness of 20 mils, showed it to have the following properties:

Heat resistance____ Only slight decrease in flexibility after 2000 hours at 200° C.
Weight loss_____ 7% after 1000 hours at 200° C.
Tensile strength___ 3000 to 5000 p. s. i.
Tear strengh_____ 350 to 400 pounds per inch
Dielectric strength V/M at 25° C.:
  s----------- } 525
  t----------- }
  s----------- } 510
  s----------- }
Volume resistivity, Megohms/cc____ 1×10$^5$ The above coated glass cloth showed no tendency for the rubbery coating to delaminate and separate from the cloth backing.

Example 3

To the paste prepared in Example 1 was added sufficient benzoyl peroxide to bring up the total per cent of the benzoyl peroxide to 12 per cent, by weight, of the starting liquid methyl polysiloxane. This paste was employed as an adhesive for several applications.

A cured, solid, elastic, polymeric dimethylsiloxane containing about 0.5 mol per cent copolymerized monomethylsiloxane was coated on one side with the aforementioned prepared paste. Another sample of the solid, elastic material was placed upon the coated surface and the pieces pressed together for 1 hour at about 175° C. Thereafter, the adhered sample was placed in an oven and given a post-bake of 15 hours at 200° C. Attempts to break the bond between the two layers of solid, elastic material resulted in a zero per cent failure in the glue line.

Previous attempts to use solid, elastic products prepared in accordance with the procedures described, for instance, in the aforementioned Agens application, for adhesive or coating applications resulted in bonds which were weaker than the materials being bonded, and in coated articles from which the rubbery layer could readily be stripped. By means of our invention, it is now possible to bond segments of solid, elastic, methyl polysiloxanes to form, for example, heat-resistant gaskets of greater size than are economically practical to mold per se, which have application where good heat resistance is desired, etc.

Example 4

In this example CaCO$_3$ lithopone, ferric oxide, lead carbonate, and zinc oxide were each employed in preparing a paste similar to the one prepared in Example 1 with the exception that, after it was determined that the proper degree of condensation of the liquid methyl polysiloxane had occurred, each of the foregoing five inorganic pigments were incorporated in place of the titanium dioxide used in Example 1. In each case a homogeneous paste was obtained whose properties were similar to those obtained by using titanium dioxide.

Example 5

This example illustrates the procedure employed for adhering sheets of solid, elastic, polymeric dimethylsiloxane containing up to 2 mol per cent copolymerized monomethylsiloxane to metal surfaces by means of the adhesive composition prepared according to the directions in Example 3.

A flat metal surface was coated with a thin film of a heat-curable methylpolysiloxane resin (prepared by cohydrolyzing, by weight, 90 per cent methyltrichlorosilane and 10 per cent dimethyldichlorosilane). The coated metal strip was heated for about 1 hour at 200° C. Thereafter the adhesive paste (prepared in Example 3) containing 12 per cent, by weight, benzoyl peroxide, was applied to the coated metal surface and a sheet of solid, elastic, cured, polymeric methylsiloxane was applied to the coated surface and the total assembly pressed at contact pressure for 20 minutes at about 180° C. The panel thus obtained was subjected to an after-bake of 15 hours at 200° C. to give a solid composite mass whose glue line was at least as strong as the solid, elastic, polymeric methylsiloxane (silicone rubber) bonded to the metal.

The foregoing procedure described in Example 5 can be used to effect heat-resistant metal-to-metal bonding and bonding between silicone rubber and laminated glass cloth panels (using a silicone resin as the impregnating and coating agent for the glass cloth laminae), etc. We have found that alkyd-silicone resins prepared in accordance with the process described and claimed in Doyle et al. application Serial No. 787,624, filed November 27, 1947, and assigned to the same assignee as the present invention are eminently suitable as priming coatings for metal surfaces to which it is desired to bond, by means of our claimed adhesive compositions, either other metal surfaces or silicone rubber.

The claimed compositions of matter also have eminent utility as potting compositions, for example, for high temperature electronic tubes, as a sealer for lap joints in metals, etc.

What we claim as new and desire to secure by Letters Patent of the United States is:

1. The process which comprises (1) heating a mixture comprising (a) a liquid polymeric dimethylsiloxane containing an average of from 1.98 to 2.0 methyl groups per silicon atom and containing up to 2 mol per cent copolymerized monomethylsiloxane and (b) a condensation catalyst for (a) until the thickening mass has just passed from the "stringy" stage to a stage wherein a hot sample drop removed from the said mass, when immediately touched with a rod, fails to give a string when the rod is withdrawn, but instead snaps back, and (2) adding to the molten mass obtained in (1) a finely divided, water-insoluble, wholly inorganic pigment selected from the class consisting of metallic oxides and metallic salts.

2. The product obtained in accordance with the process of claim 1.

3. A process for preparing a composition of matter suitable for use as an adhesive and a coating composition which process comprises (1) heating a mixture comprising (a) a liquid polymeric dimethylsiloxane containing an average of from 1.98 to 2.0 methyl groups per silicon atom and containing up to 2 mol per cent copolymerized monomethylsiloxane and (b) an iron halide until the thickening mass has just passed from the "stringy" stage to a stage wherein a hot sample drop removed from the said mass, when immediately touched with a rod, fails to give a string when the rod is withdrawn but instead snaps back, and (2) adding to the molten mass obtained in (1) a finely divided, water-insoluble, wholly inorganic pigment selected from the class consisting of metallic oxides and metallic salts.

4. A process as in claim 3 wherein the iron halide is anhydrous ferric chloride.

5. The process as in claim 3 wherein the inorganic pigment is titanium dioxide.

6. The process as in claim 3 wherein the inorganic pigment is lithopone.

7. The method of making a composition of matter suitable for use as a heat-resistant adhesive, which method comprises (1) heating a mixture comprising (a) a liquid polymeric dimethylsiloxane containing an average of from 1.98 to 2.0 methyl groups per silicon atom and containing from 0.01 to 2 mol per cent copolymerized monomethylsiloxane and (b) a condensation catalyst for (a) until the thickening mass has just passed from the "stringy" stage to a stage wherein a hot sample drop removed from the said mass, when immediately touched with a rod, fails to give a string when the rod is withdrawn, but instead snaps back, (2) adding to the molten mass obtained in (1) a finely divided, water-insoluble, wholly inorganic pigment selected from the class consisting of metallic oxides and metallic salts, and (3) heating and stirring the mass thereby obtained until a homogeneous paste is obtained.

8. The process for preparing a composition of matter having utility as a heat-resistant adhesive composition, which process comprises (1) heating at a temperature from 80° to 130° C. a mixture comprising (a) a liquid polymeric dimethylsiloxane containing an average of from 1.98 to 2.0 methyl groups per silicon atom and containing from 0.01 to 2 mol per cent copolymerized monomethylsiloxane and (b) a condensation catalyst for (a) until the thickening mass has just passed from the "stringy" stage to a stage wherein a hot sample drop removed from the said mass, when immediately touched with a rod, fails to give a string when the rod is withdrawn but instead snaps back, (2) adding to the molten mass obtained in (1) a finely divided, water-insoluble, wholly inorganic pigment selected from the class consisting of metallic oxides and metallic salts, (3) heating and stirring the mass obtained thereby until a homogeneous paste results, and (4) adding to the paste obtained in (3) from 9 to 15 per cent, by weight, benzoyl peroxide, based on the weight of the starting liquid methyl polysiloxane.

9. An adhesive composition prepared in accordance with the process described in claim 8.

RALPH L. POSKITT.
GEORGE S. IRBY, Jr.

No references cited.